United States Patent Office 2,898,582
Patented Aug. 4, 1959

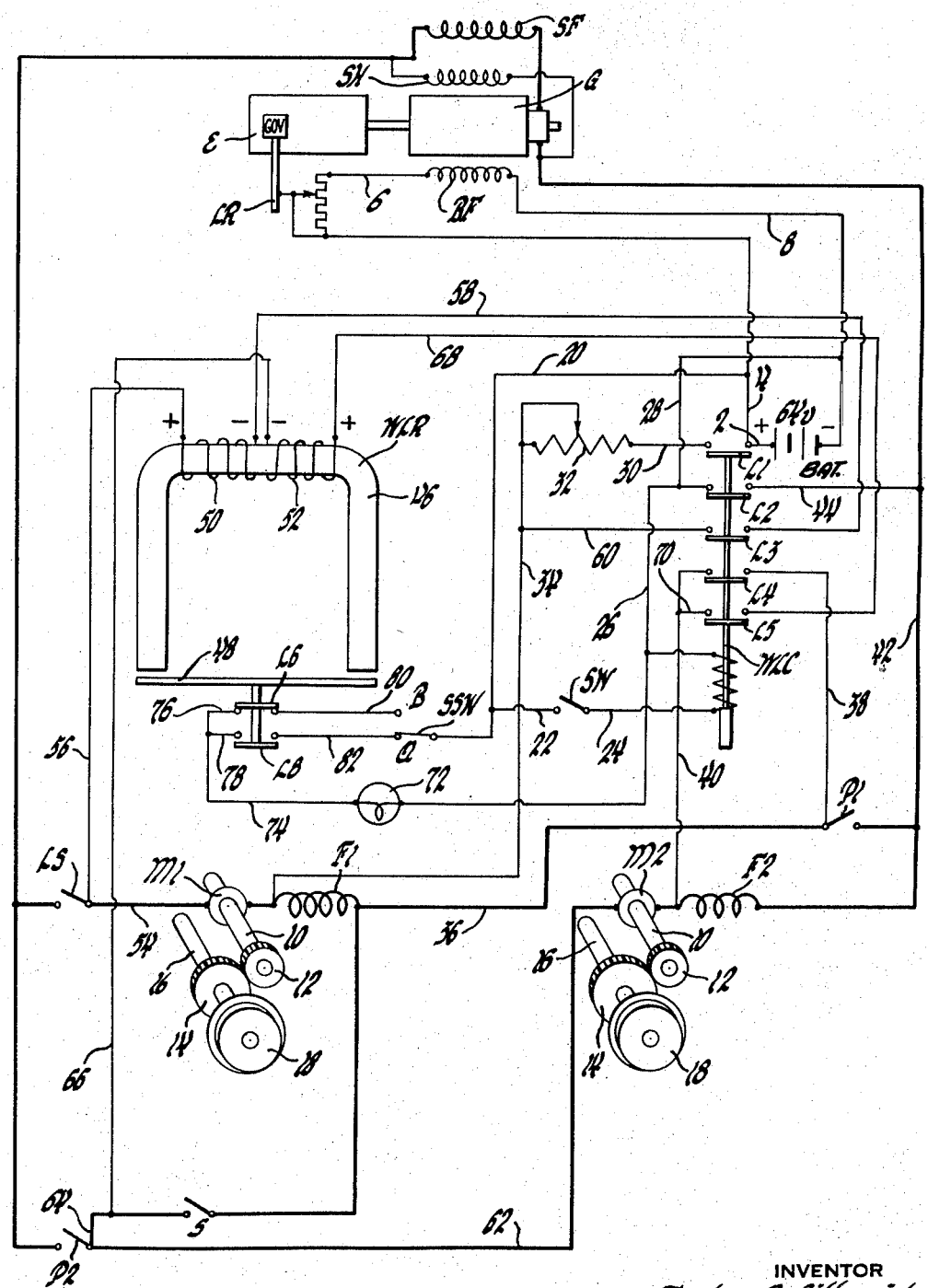

2,898,582

WHEEL LOCK AND WHEEL SLIDE DETECTION SYSTEM

Torsten O. Lillquist, La Grange Park, Ill., assignor to General Motors Corporation, Detroit, Mich., a corporation of Delaware Application December 17, 1954, Serial No. 476,048

3 Claims. (Cl. 340—268)

In towing or pushing or otherwise propelling a locomotive by means other than its own power, i.e., when the power of the towed locomotive is idling or shut down for reasons such as a breakdown in the mechanical parts of the locomotive, derailment, etc., situations often occur in which the wheels of the locomotive being towed or pushed or otherwise propelled are locked or braked in some inadvertent way so as to cause them to slide along the rails. This is, as will be immediately appreciated, an extremely undesirable condition which results in a high rate of wear on the rails, flat spots on the wheels of the towed locomotive and an increase in the drag or load of the means towing or otherwise propelling the dead locomotive. Assuming the power plant of the towed locomotive to be shut down there is nothing to indicate that such a condition, i.e., locked or sliding wheels, is present and usually the condition is not discovered until the locomotive has been towed to its destination and inspected.

Other wheel slip systems, while capable of detecting and correcting the wheel slip during self-propulsion of the vehicle, are not adapted to take care of the wheel slide or wheel lock which might occur during towing of the locomotive and it is with this problem and the correction of the undesirable conditions stated above that the present invention is concerned.

A special problem sometimes occurs in the towing of such a vehicle if the towed locomotive is damaged because of a broken or burnt off pinion on a traction motor armature shaft, or breakage of the shaft itself, etc., which would allow one set of locomotive wheels to rotate independently of the armature of the traction motor with which it is normally associated. In such instance differential voltages which might otherwise be set up by the damaged motor and another cannot be relied on to detect the wheel slip and additional means to take care of such a situation must be provided.

It is a purpose of this invention to provide novel means for detecting wheel slide or lock of the undamaged motor in such a situation.

For a fuller understanding of this invention and the objects thereof attention is directed to the accompanying detailed description and drawing which represents a schematic diagram of this new wheel lock and slide detection system.

In the drawing the letter G indicates a main generator of a Diesel electric locomotive. The generator G is driven by a Diesel engine E provided with the usual governor GOV. The generator G has excitation means including a series field SF, a shunt field SH and a separately excited field BF. The battery field BF receives its energy from a voltage source such as a battery BAT and is connected in series with a variable resistor or load regulator LR which is operated by the engine governor GOV in a well-known way so as to maintain the power output of the main generator substantially constant through an operating range. The circuit for accomplishing the variable energization of the battery field BF begins at the positive side of the battery BAT and includes a conductor 2, conductor 4, the resistive portion of the load regulator LR, a conductor 6, battery field BF and a conductor 8, returning to the negative side of the battery BAT.

The generator G supplies by means of the heavy lines in the diagram electrical power to, in this case, a pair of traction motors M1 and M2 having series field exciting windings F1 and F2, respectively. It will be observed that the motors M1 and M2 have their armature shafts 10 journaled for rotation in bearings provided in the traction motor housings. Splined, keyed or otherwise secured to the armature shafts 10 for rotation therewith are pinions 12 which mesh in driving engagement with large driving gears 14 secured for rotation to axles 16 having wheels 18 on the ends thereof.

The motors M1 and M2 may be connected in series or in parallel relationship across the generator G by means of the switches LS, S, P1, P2. For example, closure of switches LS and S while switches P1 and P2 are open will connect the traction motors in series across the generator; whereas closure of switches LS, P1 and P2 with switch S open will connect the motors in parallel across the generator G.

In normal operation of the locomotive during acceleration the motors are initially connected in series across the generator and, after the back voltage has built up a predetermined amount, are reconnected in parallel across the generator. As mentioned, this is accomplished by proper operation of the switches LS, S, P1 and P2 which may be accomplished either manually or automatically in a well-known way needing no further elucidation here. It should be mentioned, however, that when the locomotive is shut down or idling the switches LS, S, P1 and P2 are normally opened in a well-known way so that the motors M1 and M2 are disconnected from the generator G.

During normal operation of the locomotive, there will be current flowing through the traction motor armature leads and this current has in the past been utilized in various ways to detect and correct wheel slip. If the locomotive is shut down or idling, however, and the motors M1 and M2 are disconnected from the generator G there will be no current flowing through these traction motor leads which can be utilized to detect wheel slip. The present invention obviates this difficulty by providing a relay WLC and a relay WLR and uniquely connecting them into the main power system of the locomotive in a manner which will appear in detail below.

The relay WLC is provided with a plurality of interlocks normally open when relay WLC is de-energized, which when viewing the drawing are numbered L1, L2, L3, L4 and L5, reading from the top down. Relay WLC may be connected to the battery BAT and energized thereby by closure of a switch SW. Closure of switch SW may be accomplished manually or automatically, as for example, when the throttle of the diesel engine is moved to the idle or off position automatic means which are often provided to automatically cause switches LS, S, P1 and P2 to open could also be utilized to cause switch SW to close. Closure of switch SW will energize relay WLC to cause closure of its interlocks L1 through L5. Relay WLC is energized by means of current which flows from the positive side of the battery BAT through conductors 2 and 4, a conductor 20, conductor 22, switch SW, a conductor 24, the energizing winding of relay WLC, conductors 26 and 28 and conductor 8, returning to the negative side of the battery BAT. Upon energization of relay WLC and closure of its five interlocks the fields F1 and F2 of the traction motors M1 will be energized. Fields F1 and F2 are energized by means of current flowing from the positive side of the battery BAT through conductor 2, now closed interlock L1, a conductor 30, a calibrating resistor 32, a conductor 34, field F1, heavy power conductor 36, a conductor 38, the now closed interlock L4, a conductor 40, field F2, a heavy power conductor 42, a conductor 44, the now closed interlock L2, and conductors 28 and 8, returning to the negative side of the battery BAT.

Referring now to relay WLR it will be observed that it includes a U-shaped yoke 46 and an armature 48 having a normally closed interlock L6 when the relay is de-energized and a normally open interlock L8 when the relay is de-energized. Relay WLR also includes on the yoke 46 a pair of windings 50 and 52 which are oppositely wound so that the fields thereof are in bucking relation to each other. The windings 50 and 52 are connected across the armatures of motors M1 and M2, respectively, upon energization of the relay WLC. This will appear if one starts from the left-hand side of the armature of motor M1 as viewed in the drawing and follows motor lead 54, conductor 56, winding 50, conductor 58, closed interlock L3 (assuming relay WLC to be energized), conductor 60, and conductor 34 which returns to the right-hand side of the armature of motor M1 as viewed in the drawing. Winding 52 of the relay WLR is connected across the armature motor M2 by energization of relay WLC as will appear by beginning with the left-hand side of the armature of motor M2 as viewed in the drawing and following the motor lead 62, power conductor 64, a conductor 66, winding 52, conductor 68, now closed interlock L5, conductor 70 and conductor 40, returning to the right-hand side of the armature of motor M2 as viewed in the drawing. An indicator means such as a light 72 has one side connected to the negative side of the battery BAT by conductors 26, 28, and 8 and the opposite side adapted to be connected to the positive side of the battery BAT by means of the conductors 74, 76 or 78, interlocks L6 or L8, conductors 80 or 82, a selector switch SSW, and conductors 20, 4 and 2.

The operation of the wheel lock and slide detection means is as follows: Let it be assumed that the locomotive is either idling or shut down and propelled by some external means, i.e., so that the wheels 18 and the motor armatures M1 and M2 should be turning and the switches LS, S, P1 and P2 are open and also let it be assumed that switch SW has been closed and switch SSW has been moved to its lower or A position as viewed in the drawing. Under such conditions the motor fields F1 and F2, as previously described, will be energized and the windings 50 and 52 of the relay WLR will be connected across the armatures of motors M1 and M2, respectively, but in bucking relation so that the fluxes generated thereby tend to cancel each other. If, however, the wheels of motor M1, for example, should slide or be blocked, the armature of motor M1 would no longer turn and no flux opposing the flux of coil 52 would be generated by the winding 50. This would result in energization of the relay WLR and movement of the armature 48 upwardly as viewed in the drawing so as to complete the circuit including the light 72 and battery BAT to thereby indicate wheel slide or lock and that the locomotive should be stopped, the matter investigated and the trouble corrected.

As previously mentioned, there are occasions when the reason for the locomotive being towed or for being otherwise externally propelled is caused by damage or failure of one of the motors; for example, by failure of one of the pinions 12 or one of the gears 14, or breakage of the traction motor armature shaft 10, or any damage which would cause the wheels 18 to rotate independently of the traction motor armature. In this latter case, even though the wheels of motors M1 and M2 were turning at equal speeds, the balanced bucking relation of the flux of windings 50 and 52 would be upset, armature 48 would be picked up and an indication by the light 72 would be obtained. To take care of such a contingency and to obtain wheel lock indication of the undamaged motor, the selector switch SSW is moved to its upper or B position. With switch SSW in its upper or B position during towing of the locomotive, the relay WLR remains energized as long as the wheels connected to the undamaged motor continue to rotate. Energization of relay WLR will keep armature 48 picked up so that interlock L6 is open and interlock L8 is now closed. This will result in de-energization of light 72 and no wheel slide or lock indication. If, however, wheel lock should occur in the undamaged motor the winding on yoke 46 connected across the armature of the undamaged motor would become de-energized (the other winding is already de-energized since the damage to one of the motors is such that the wheels thereof do not turn the armature) causing the armature 48 of relay WLR to drop out so that interlock L6 is again closed and light 72 is again energized to indicate that wheel lock is taking place in the undamaged motor.

What I claim is:

1. In a self-propelled railway vehicle having a generating electrical power source and a pair of electrical traction motors each including excitation means therefor, an armature to which driving wheels are attached and switching means for connecting said motors to receive power from said source, means to detect slippage of said wheels when said motors are disconnected from said power source by said switching means and said vehicle is propelled by means other than said power source comprising a voltage source in said vehicle other than said power source, relay means including an energizing winding therefor, switching means in series electrical circuit with said winding and said voltage source operable to operate said relay means, said relay means including contacts in series with the excitation means of said motors and said voltage source operable on operation of said relay means to connect said excitation means across said voltage source so that said motors when said vehicle is so propelled act as separately excited generators, electrical indicator means, a second relay means including a pair of windings of opposite polarity connected across respective armatures of said traction motor operable upon an unbalance of current caused by slippage of the wheels connected to said armatures to connect said indicator means to said voltage source.

2. In a self-propelled railway vehicle having a generating electrical power source and an electrical traction motor including an armature to which driving wheels are normally connected for rotation, excitation means and switching means for connecting said motor to receive power from said source, and means to detect slippage of the wheels of said motor when said motor is disconnected from said power source by said switching means and said vehicle is externally propelled, comprising a voltage source in said vehicle other than said power source, relay means including an energizing winding therefor, switching means in series electrical circuit with said winding and said voltage source operable to operate said relay means, said relay means including contacts in series with the excitation means of said motor and said voltage source operable on operation of said relay means to connect said excitation means across said voltage source so that said motor acts as a separately excited generator when so propelled, electrical indicator means, a circuit including a switch adapted to connect said indicator means across said voltage source, a second relay means including a winding connected across the armature of said traction motor and an armature connected to said switch operable upon rotation of the wheels and armature of said motor to disconnect said indicator means from said voltage source.

3. In a self-propelled railway vehicle having a generating electrical power source and a pair of electrical traction motors each including an armature to which driving wheels are normally connected for rotation, excitation means and switching means for connecting said motors to receive power from said source, means to detect slippage of the wheels of one of said motors when said motors are disconnected from said power source by said switching means and said vehicle is externally propelled and the wheels normally connected to the other of said motors are independently rotatable relative to the armature thereof comprising a voltage source in said vehicle other than said power source, first relay means including an energizing winding therefor, switching means in series electrical circuit with said winding and said voltage source operable to operate said relay means, said first relay means including contacts in series with the excitation means of said motors and said voltage source operable on operation of said first relay means to connect said excitation means across said voltage source so that the one of said motors acts as a separately excited generator when so propelled, electrical indicator means, a second relay means including a pair of windings and an armature, said first relay means including contacts in series with said pair of windings operable on operation of said first relay means to connect said windings across respective armatures of said traction motors in bucking relation, contacts on the armature of said second relay means closed when said second relay is de-energized and in series electrical circuit with said indicator means, contacts on the armature of said second relay means open when said second relay is de-energized and in series electrical circuit with said indicator means and in parallel with said normally closed contacts, and selective switching means interposed in series electrical circuit with said voltage source and the normally closed and open contacts on the armature of said second relay means and said indicator means operable to determine how said indicator means will be operated when the armature of said second relay means is picked up or dropped out.

References Cited in the file of this patent

UNITED STATES PATENTS

| | | |
|---|---|---|
| 2,372,145 | Weybrew | Mar. 20, 1945 |
| 2,436,341 | Weybrew | Feb. 17, 1948 |
| 2,592,342 | Ryckman | Apr. 8, 1952 |
| 2,701,873 | Bard | Feb. 8, 1955 |
| 2,735,090 | Maenpaa | Feb. 14, 1956 |
| 2,815,503 | Amos | Dec. 3, 1957 |